United States Patent Office 2,922,793
Patented Jan. 26, 1960

2,922,793

2-ALLYLIC THIO PYRIDINE N-OXIDES

Jack Rockett, Metuchen, N.J., assignor to Olin Mathieson Chemical Corporation, New Haven, Conn., a corporation of Virginia No Drawing. Application January 6, 1958
Serial No. 707,149

6 Claims. (Cl. 260—294.8)

This invention relates to a new group of chemical compounds and to the preparation thereof. More particularly, this invention relates to novel derivatives of 2-mercaptopyridine-1-oxide which display biological activity.

The compounds of the present invention are represented by the following general formula:

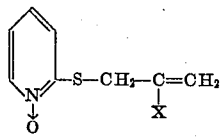

wherein X represents hydrogen, halogen or an aliphatic group containing from 1 to 5 carbon atoms.

It has been found that the compounds of the general formula display biological activity and, more particularly, that the compounds possess pesticidal properties. They have been found to be particularly effective when used as fungicides for application to plant foliage. They can be employed in any of the forms conventionally employed for the application of pesticides.

The compounds of the invention are readily prepared by the reaction of a suitable salt of 2-mercaptopyridine-1-oxide, such as the sodium salt, with an allyl halide in a suitable solvent medium. While the use of an anhydrous aliphatic alcohol as the solvent is preferred, other inert polar solvents, such as dioxane in which sodium pyridinethione is only slightly soluble and forms a thick suspension, can be used.

The compound referred to herein as 2-mercaptopyridine-1-oxide, although generally represented as:

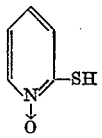

is more accurately represented as a tautometer of two possible structures, as follows:

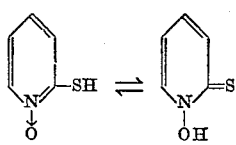

The synthesis of S-(2-pyridyl-1-oxide) allyl and substituted allyl sulfides and the biological testing thereof are more fully illustrated by the following, non-limitative examples:

Example I

A solution of 44.7 g. (0.3 mole) of the sodium salt of 2-mercaptopyridine-1-oxide in 650 cc. of absolute ethanol was prepared and filtered into a flask. 22.9 g. (0.3 mole) of allyl chloride was added dropwise and the flask contents were then heated and stirred at 31–34° for about 4 hours as a precipitate gradually formed. The flask contents were heated to 39° for another five hours and then heated at reflux temperatures for two hours. The solution was filtered and the ethanol was distilled from the filtrate at reduced pressure. The remaining oil crystallized, providing 38.6 g. of (2-pyridyl-1-oxide) allyl sulfide, a 77.1% yield. The product had a melting point of 73–74° C. after it was recrystallized from benzene plus hexane.

Analysis.—Calc'd. for $C_8H_9NOS$: S, 19.18%, C, 57.4%, H, 5.38%. Found: S, 19.41%, C, 57.34%, H, 5.80%.

Example II

A solution of 44.7 g. (0.3 mole) of the sodium salt of 2-mercaptopyridine-1-oxide was dissolved in 700 cc. of absolute ethanol and filtered into a reaction flask. To it was added 27.2 g. (0.3 mole) of methallyl chloride and the flask contents were stirred and heated to 35° for five hours. A precipitate of sodium chloride formed gradually. Now the flask contents were heated to reflux temperature for five hours. The solution was filtered and the ethanol was distilled from the filtrate at reduced pressure. 44.0 g. (.243 mole) of a clear oil remained, an 81.1% yield of (2-pyridyl-1-oxide) methallyl sulfide.

Example III

A solution of 52.2 g. (0.35 mole) of the sodium salt of 2-mercaptopyridine-1-oxide was suspended in 400 cc. of dioxane. Now 38.9 g. (0.35 mole) of 2,3-dichloropropene were added dropwise at 35–40°. An ice bath was applied intermittently to keep the temperature from exceeding 40°. When the addition was complete, the temperature was raised to 80–90° and maintained for one hour. The reaction mixture was filtered and the dioxane was distilled at reduced pressure. There remained 49.7 g. (0.247 mole) of a clear oil, a 70.5% yield of (2-pyridyl-1-oxide) (2'-chloroallyl) sulfide.

The compounds of this invention are adapted to be employed for the control of various pests, particularly of agricultural pests. The compounds, which in most cases are liquids, may be dispersed on an inert finely divided solid and employed as a dust. Suitable solid carriers are clay, talc, bentonite, as well as other carriers known in the art (see Frear, "Chemistry of Insecticides, Fungicides and Herbicides"). The compounds may also be applied as a spray in a liquid carrier either as a solution in a solvent or as a suspension in a non-solvent such as water. When applied as a suspension it may be desirable to incorporate wetting agents. The compounds of this invention may also be admixed with carriers that are themselves active, such as other parasiticides, herbicides and fertilizers.

Foliage fungicide tests, as described in "Phytopathology," volume 33, pages 627–632 (1943), and volume 37, pages 354–356 (1947), showed that a concentration of 25 parts per million of S-(2-pyridyl-1-oxide) allyl sulfide inhibited the germination of 97% of the spore of *Monolinia fructicola,* an organism which causes brown rot of stone fruits.

The foregoing test indicates the utility of the novel compounds of this invention as biologically active agents, particularly as displaying useful fungicidal properties.

The invention having been disclosed what is believed to be new and desired to be secured by Letters Patent is:

1. A compound of the general formula:

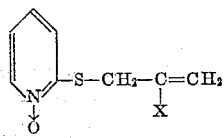

wherein X is a member selected from the group consisting of hydrogen, halogen and lower alkyl groups containing from 1 to 5 carbon atoms.

2. (2-pyridyl-1-oxide)-allyl sulfide.
3. (2-pyridyl-1-oxide)-methallyl sulfide.
4. (2-pyridyl-1-oxide) (2'-chloroallyl) sulfide.
5. A process for the preparation of a compound of the formula defined in claim 1 which comprises reacting a salt of 2-mercaptopyridine-1-oxide with an allyl halide in an inert solvent medium, and recovering the product.
6. A process for the preparation of (2-pyridyl-1-oxide)-allyl sulfide which comprises reacting the sodium salt of 2-mercaptopyridine-1-oxide with allyl chloride in a reaction medium comprising absolute ethanol.

References Cited in the file of this patent

UNITED STATES PATENTS 2,686,786  Shaw _____ Aug. 17, 1954

OTHER REFERENCES

Tarbell et al.: J. Am. Chem. Soc., vol. 74, pp. 48–50 (1952).